(No Model.)

S. H. KNAPP & A. E. ADAMS.
ELECTRICAL PILOT CAR FOR LOCOMOTIVES.

No. 280,046. Patented June 26, 1883.

WITNESSES:
C. Neveux
G. Sedgwick

INVENTOR:
S. H. Knapp
A. E. Adams
BY Munn & Co
ATTORNEYS.

UNITED STATES PATENT OFFICE.

SMITH H. KNAPP AND ALPHEUS E. ADAMS, OF DANBURY, CONNECTICUT.

ELECTRICAL PILOT-CAR FOR LOCOMOTIVES.

SPECIFICATION forming part of Letters Patent No. 280,046, dated June 26, 1883.

Application filed February 5, 1883. (No model.)

*To all whom it may concern:*

Be it known that we, SMITH H. KNAPP and ALPHEUS E. ADAMS, of Danbury, in the county of Fairfield and State of Connecticut, have invented a new and Improved Pilot-Car for Locomotives, of which the following is a full, clear, and exact description.

The object of our invention is to provide a new and improved pilot-car which runs some distance in advance of the locomotive and signals all obstructions on the track, and thus prevents collisions, derailments, and other like accidents.

Reference is to be had to the accompanying drawings, forming part of this specification, in which similar letters of reference indicate corresponding parts in all the figures.

Figure 3:
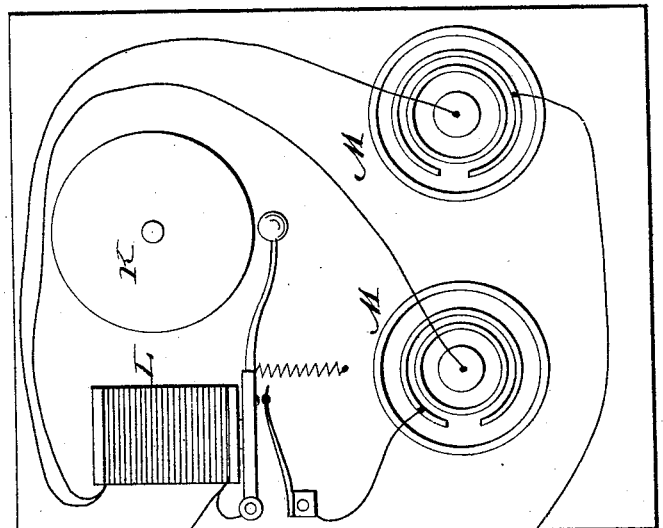
Figure 1:
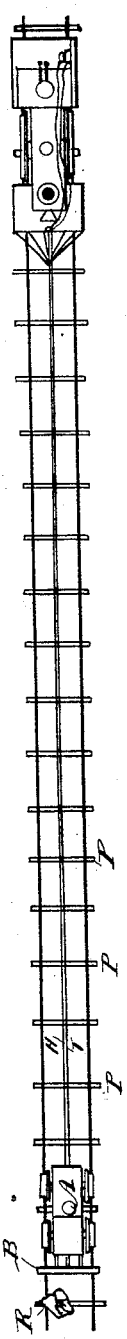
Figure 2:
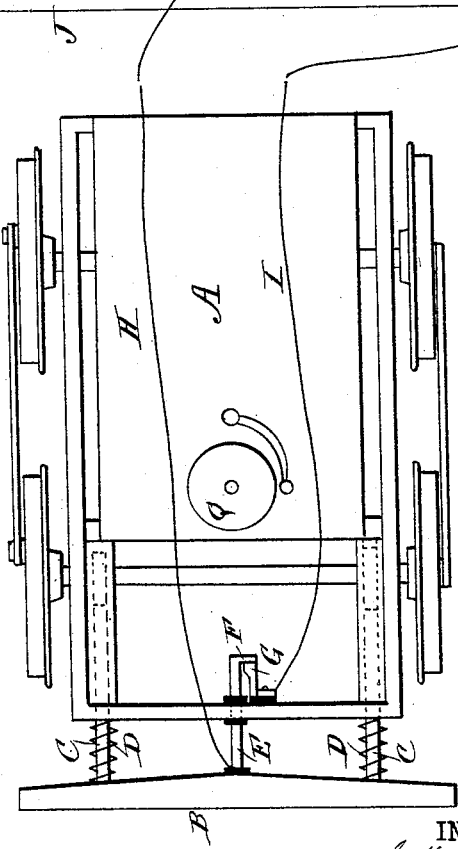

Figure 1 is a plan view of a section of the railway-track and a locomotive provided with a pilot-car on the said track. Fig. 2 is a plan view of the pilot-car. Fig. 3 is a front view of the alarm apparatus on the locomotive.

A small car, A, contains an electromotor, which acts on one of the axles, and a storage-battery or other suitable battery for producing the required electricity for operating the car. The car is to be made as small and as light as possible. On the front end of the car a cross-piece, B, is held, which is provided on its rear side with two rods, C, which extend into recesses in the car, and are surrounded by spiral springs D, which press the cross-piece B from the front end of the car.

In place of the spiral springs D, any other suitable springs can be used.

An arm, E, provided at its inner end with a hook, F, projects from the rear surface of the cross-piece B through the front of the car, and when the springs D press the cross-piece B from the front end of the car the hook F will be in contact with the contact-piece G, held on the front of the car. The arm E is connected by means of a wire, H, with one pole of an electric alarm apparatus, J, in the caboose of the locomotive O, and the contact-piece G is connected by means of a wire, I, with the other pole of the apparatus. The alarm apparatus is provided with a gong, K, a coil, L, and one or more cells, M M, suitably connected with the coil.

In the case shown, the wire H is connected directly with the coil L, and the wire I is connected with one of the cells M; but the electrical connection can be modified more or less as circumstances may require. The car A runs on the track about one-eighth of a mile in advance of the locomotive, and the wires H I extend from the car to the locomotive. As the wires will be apt to sag to the ground and form electrical connection with the ground, we arrange glass ties P, suitable distances apart, under or between the rails, so that if the wires sag they will rest on the glass ties and cannot come in contact with the ground.

The battery in the car A must be of such power that it can operate the mechanism on the car A so rapidly that the said car will always be in advance of the locomotive a suitable distance. Devices can also be provided for winding the wires H I on drums on the locomotive, and thus drawing the car A close to the front of the locomotive. This would be necessary before arriving at crossings or while switching.

A gong, Q, is provided on the car, which gong can be operated by suitable mechanisms connected with the electric motor or the battery in the car. This gong serves as a signal, and always signals the approach of the car A in advance of the locomotive. At night suitable lanterns are to be placed on the car A, so that the same can be seen when approaching, and, if desired, flags or other signals may be placed on the car in the day-time, so as to signal the approach of the same.

The operation is as follows: The springs D press the cross-piece B from the front of the car, and press the hook F against the contact-piece G, whereby the circuit will be closed and will pass through the electro-magnet L, which attracts its armature, to which the hammer of the gong K is attached. If an obstruction, R—for instance, a stone, a tie, another car, a body, or any other object—is on the tracks, the cross-piece B of the car A will strike against it and will press against the end of the car, whereby contact between the hook F and the contact-piece G will be broken, the circuit will be broken, and the gong K will be sounded, thus calling the attention of the engineer to the fact that there is an object on the track. The engineer can then stop the train and avoid an accident. After the obstruction on the track has been removed, the train proceeds as before.

Our pilot-car will be an especial advantage in tunnels, at night, during foggy weather, snow-storms, &c., and will also be of great service during clear weather to prevent running in open switches, as the pilot-car will certainly run into the open switch first, will strike against the cars on the same, and will thus signal to the engineer on the locomotive, who can stop the train in time to avoid accident thereto.

We are aware that it is not new to use a truck or car with a train of cars, the same traveling in advance of the train, and provided with a self-acting electro-magnetic engine adapted to signal the engineer, so that he may stop the train before reaching the point of danger; but

What we claim as new and of our invention is—

1. The combination, with a pilot-car, of a front cross-piece, B, having rods C C, surrounded by spiral springs D, working in holes of the car-frame front, and provided with a hook-arm, F E, connected with one pole of an electric alarm, and a contact-piece, G, connected with the other pole, as shown and described.

2. The combination, with a locomotive, of a pilot-car running in advance of the same, an electric alarm on the locomotive, wires for connecting the pilot-car with the locomotive, and glass ties placed under or between the rails for preventing the wires connecting the pilot-car with the locomotive from coming in contact with the ground, substantially as herein shown and described, and for the purpose set forth.

SMITH H. KNAPP.
ALPHEUS ELI ADAMS.

Witnesses:
JOHN TWEEDY,
DAVID B. BOOTH.